Figure 1:
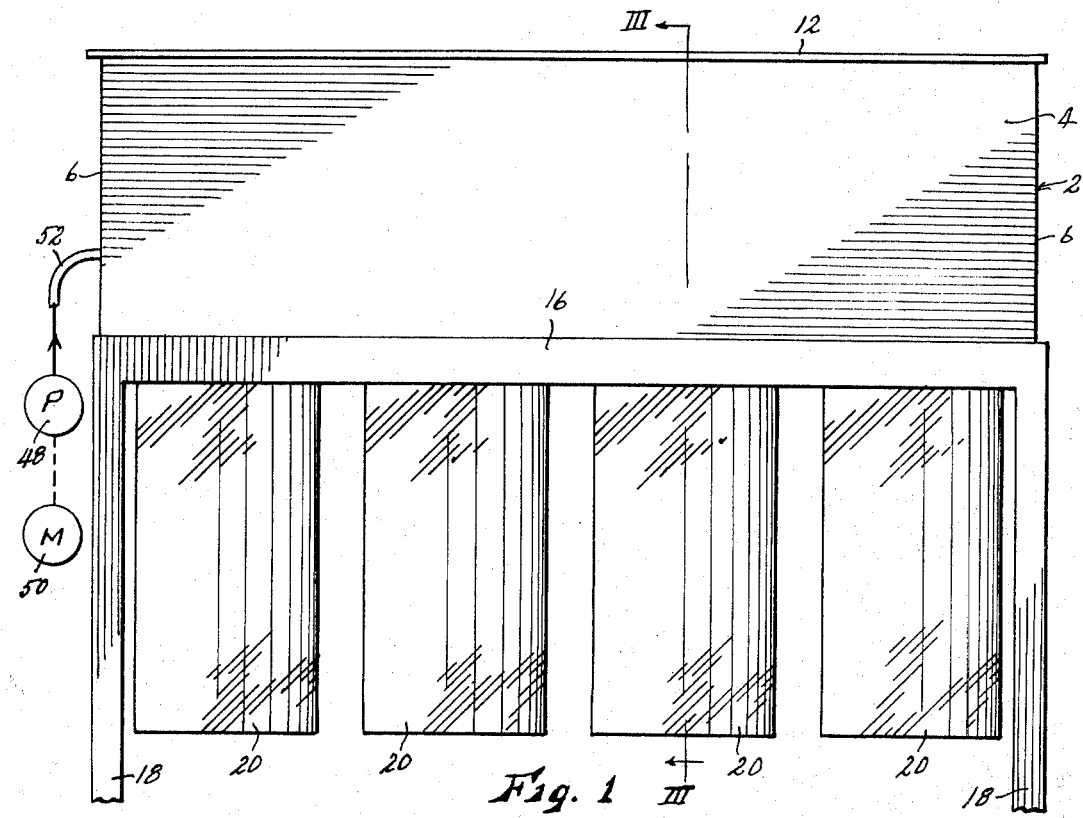

United States Patent [19]
Whitener

[11] 3,757,739
[45] Sept. 11, 1973

[54] ISOLATION AQUARIUM

[76] Inventor: Kevin F. Whitener, 812 East St., Parkville, Mo. 64152

[22] Filed: Mar. 27, 1972

[21] Appl. No.: 238,511

[52] U.S. Cl. .................................. 119/5, 210/169
[51] Int. Cl. ............................................ A01k 63/00
[58] Field of Search .................. 119/5, 3; 210/169, 210/253

[56] References Cited
UNITED STATES PATENTS

| 597,249 | 1/1898 | Smith | 119/5 |
| 3,324,829 | 6/1967 | Dosamantes De Jose et al. | 119/5 |
| 3,693,798 | 9/1972 | White | 210/169 |

Primary Examiner—Hugh R. Chamblee
Attorney—John A. Hamilton

[57] ABSTRACT

An isolation aquarium consisting of a housing carrying a plurality of tanks detachably mounted therein, a filter case detachably mounted in the housing for each of the tanks, a system powered by compressed air for constantly withdrawing water from each of the tanks, circulating it through its associated filter and returning it to the tank, the water being aerated during its circulation and filtering, mechanism for terminating the circulation but not the aeration of any tank the filter case of which is removed for servicing, and mechanism for terminating the circulation and filtration systems of any tank removed from the housing for any purpose.

7 Claims, 6 Drawing Figures

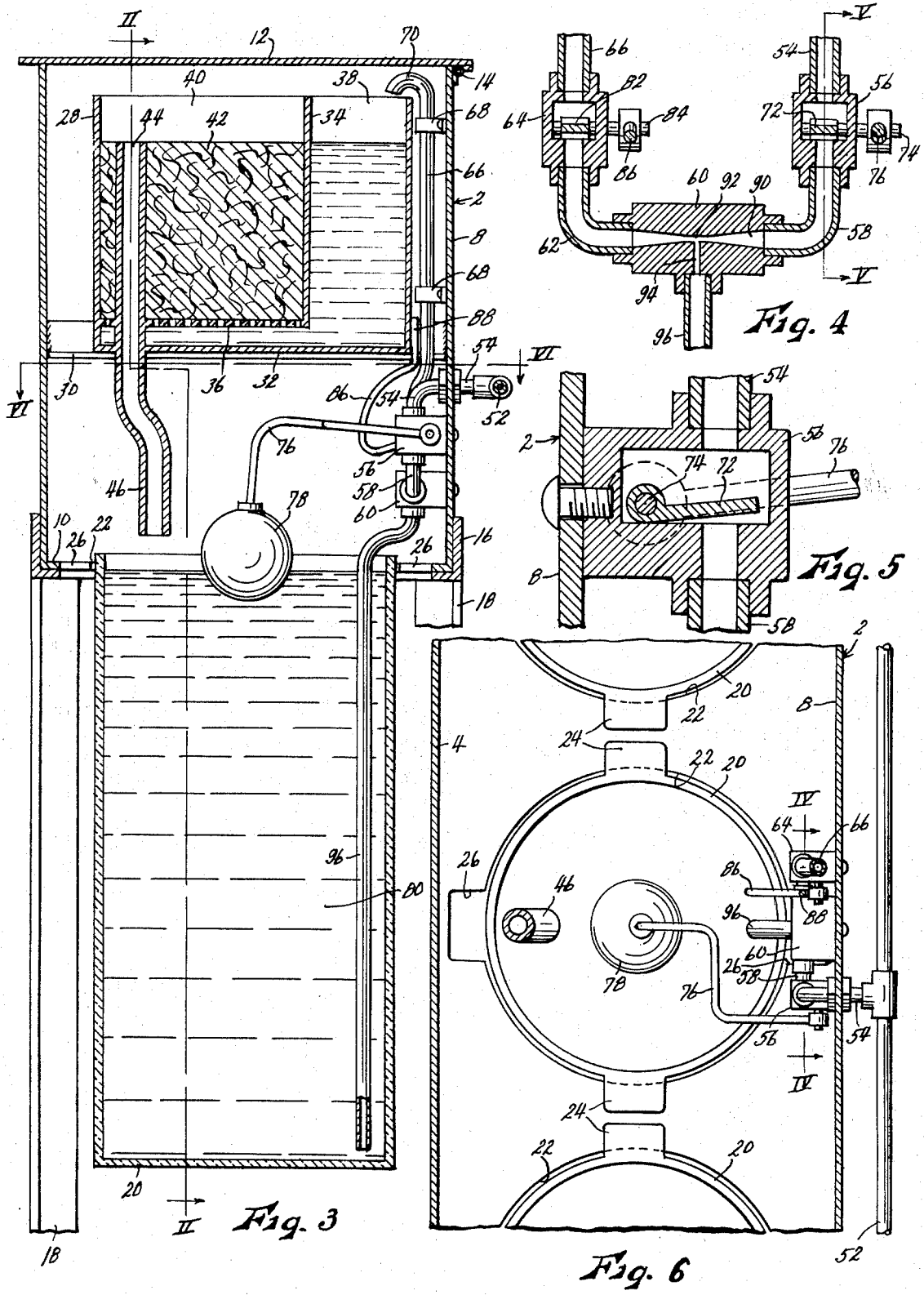

ISOLATION AQUARIUM

This invention relates to new and useful improvements in fish aquariums, and has particular reference to a multi-tank aquarium by means of which different fish may conveniently be kept segregated or isolated from others whenever this may be necessary or desirable. Such segregation or isolation is often necessary or desirable, for example, in the case of very young fish, which may be devoured by larger fish if left in the same tank, or in the case even of larger fish of species which are naturally cannibalistic, or in the case of pregnant females about to lay eggs, or in the case of sick fish requiring special treatment such as medications introduced into the tank and to which it is not desired to subject fish not sick, or in the case of valuable or prize fish which for purposes of general care and safety should not be intermixed with less valuable fish.

Accordingly, the principal object of the present invention is the provision of an aquarium including a housing having a series of tanks mounted therein, and a filter associated with each tank, and means for continuously circulating water from each tank through its associated filter, whereby it is filtered and aerated, and returning it to the tank, the circulating means of all of said tanks being powered by a single source of compressed air.

Another object is the provision of an aquarium of the character described in which each of said tanks and filters is detachably mounted in said housing so as to be easily removed therefrom whenever required for cleaning, recharging or other service, without affecting the operation of other units. Also, none of the tanks or filters have any direct or sealed connection with the compressed air system, so that no air connections need be broken to remove any of the tanks or filter units, nor reconnected to insert said units.

A further object is the provision of an aquarium of the character described having means automatically operable whenever any tank is removed from the housing to shut off the air supply to that tank, whereby not to so bleed the air system as to affect the operation of any other tank.

A still further object is the provision of an aquarium of the character described having means automatically operable whenever any one of said filter units is removed from the housing to terminate circulation of water to that unit, but to divert air to the associated tank to maintain aeration thereof.

Other objects are simplicity and economy of construction, and efficiency and dependability of operation.

Figure 2:
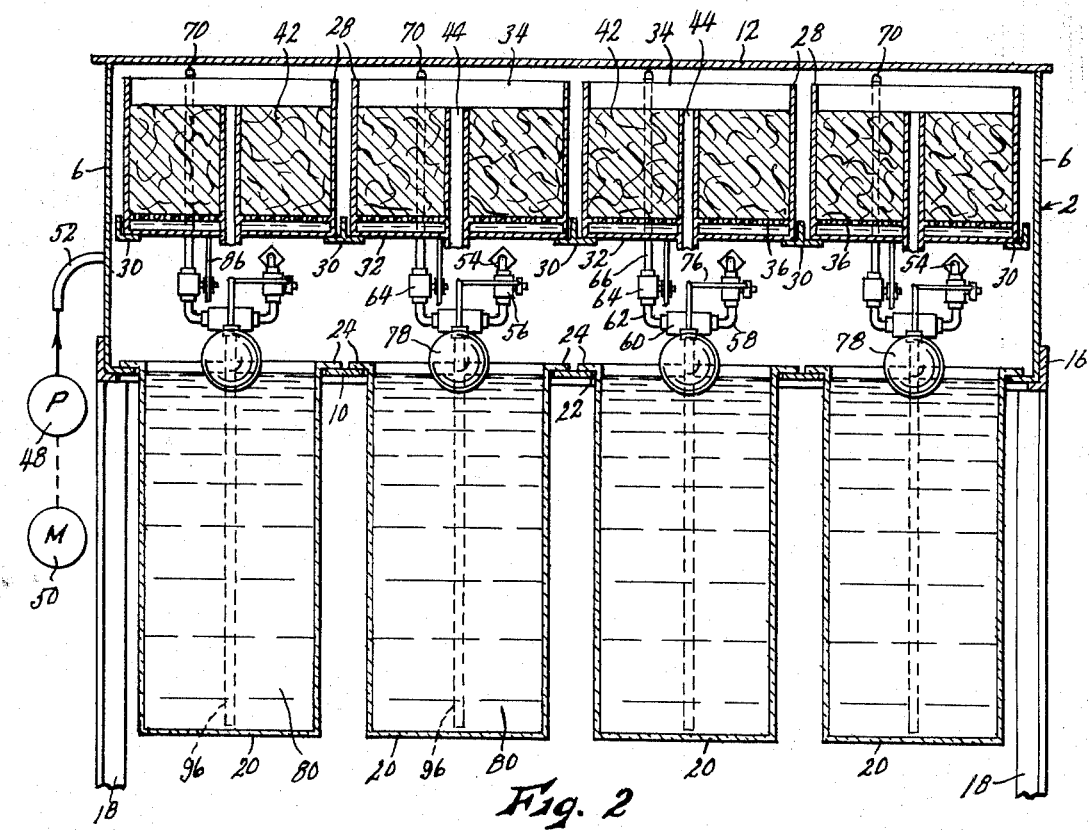

With these objects in view as well as other objects which will appear in the course of the specification, reference will be had to the accompanying drawing, wherein:

FIG. 1 is a front elevational view, partially schematic and partially broken away of an aquarium embodying the present invention, FIG. 2 is a reduced sectional view taken on line II—II of FIG. 3, FIG. 3 is an enlarged sectional view, with parts left in elevation, taken on line III—III of FIG. 1, FIG. 4 is an enlarged, framentary sectional view taken on line IV—IV of FIG. 6, FIG. 5 is an enlarged, fragmentary sectional view taken on line V—V of FIG. 4, and FIG. 6 is a fragmentary sectional view taken on line VI—VI of FIG. 3.

Like reference numerals apply to similar parts throughout the several views, and the numeral 2 applies generally to a housing comprising a generally rectilinear sheet metal box having a front wall 4, end walls 6, rear wall 8, bottom wall 10, and a top lid or cover 12 hinged thereto at 14. Said housing is supported releasably by a rectangular angle iron frame 16, which in turn is supported by four legs 18 at its corners, so as to leave the space beneath housing bottom 10 unobstructed.

A series (four shown) of tanks 20 are supported by housing 2. Each of said tanks is formed of glass and, as shown, is cylindrical in form, being open at its upper end, and is secured releasably in the housing by inserting it upwardly through a closely fitting circular hole 22 formed therefor in housing bottom wall 10, with diametrically opposite radially extending tabs 24 carried by said tank at its upper end, angularly aligned with and passing through notched enlargements 26 of holes 22 in housing bottom 10. Then the tank may be turned about its axis to move tabs 24 out of alignment with notches 26, and the tank is then supported from the housing bottom by said tabs.

A filter case 28 is supported in housing 2 above each of tanks 20. Each filter case has the form of a rectilinear box, open at its top, and is supported by angle iron strips 30 extending horizontally between and affixed to the front and rear walls of the housing. Said supports engage only the lateral edge portions of the bottom walls 32 of the filter cases, leaving the major portions of said case bottoms unobstructed. Each filter case may be moved slidably forwardly or rearwardly on its supports 30, for a purpose which will presently appear. Each filter case 28 is divide by a transverse vertical partition wall 34 extending from the top thereof to a point spaced above bottom 32 thereof, and by a horizontal perforated wall 36 extending from the lower edge of partition wall 34 to the front wall of said case, into a rear water chamber 38 and a front filter chamber 40, as best shown in FIG. 3. Water chamber 38 extends beneath the perforated floor 36 of the filter chamber, and the filter chamber is partially filled with a filter material 42 of fibrous, granular or other suitable character. A pipe 44 extends vertically through filter case floor 32 and perforated floor 36 of the filter chamber 40, in sealed relation to floor 32, extending upwardly in chamber 40 at least to the level of filter material 42, and downwardly below the filter case, terminating at its lower end in a spout 46 disposed directy above the associated tank 20.

Compressed air for powering the water circulation, aeration and filtering systems of all of tanks 20 is supplied by an air pump 48, shown schematically in FIGS. 1 and 2, driven by a small electric motor 50. Said pump and motor may be mounted, for example, on housing 2 or frame 16. Said pump delivers air under pressure to a pipe 52 extending horizontally adjacent rear wall 8 of housing 2. Branching from pipe 52, in connection with each of tanks 20, is a pipe 54 which projects inwardly through wall 8, and is interconnected with the inlet of a valve 56 mounted on the inner surface of wall 8, the outlet of said valve being connected by pipe 58 to the inlet of an aspirator pump 60 also mounted on the inner surface of wall 8. The outlet of pump 60 is connected by pipe 62 with the inlet of a valve 64 affixed to wall 8, and connected to the outlet of valve 64 is a pipe 66 which extends upwardly adjacent the inner surface of wall 8, being affixed to said wall by brackets 68, and terminates at its upper end in a forwardly and downwardly directed spout 70 adapted to discharge water into water chamber 38 of the associated filter case 28.

Valve 56 is provided with a closure member 72 (see FIG. 5) mounted on and operable by a stem 74 to which, externally of the valve, is affixed an arm 76. Affixed to the free end of said arm is a buoyant float ball 78 adapted to float on the surface of the water 80 in the associated tank 20. As long as said tank is filled with water to the proper level, ball 78 will be elevated to open valve 56, but if the tank is removed from the housing, ball 78 will drop by gravity to close valve 56. Similarly, valve 64 is provided with a closure member 82, stem 84, and operating arm 86. Instead of having a float ball attached to its free end, however, arm 86 extends first forwardly, then upwardly and rearwardly, as best shown in FIG. 3, terminating in an upwardly projecting finger 88 which engages the rearward surface of the associated filter case 28, as shown. As long as filter case 28 is in place, and moved slidably to the rear to position water chamber 38 thereof beneath spout 70, it engages and pivots arm 86 to open valve 64, but if said filter case is removed, or slid forwardly so that chamber 38 is no longer beneath spout 70, arm 86 tilts forwardly to close valve 64. It tilts forwardly by gravity, it forwardly offset configuration biasing it in a forward direction.

Aspirator pump 60 is of a common type, the passageway 90 thereof interconnecting its inlet and outlet having a restricted portion 92 into which a side passage 94 opens. Side passage 94 is connected to a pipe 96 which extends vertically downwardly into the associated tank 20, its lower end being open and terminating just above the bottom of the tank. Air passing through restriction 92 creates a suction which draws water from tank 20 upwardly through pipe 96, and delivers it to the pump outlet. Pipe 96 is supported entirely by the body of pump 60 and is not directly connected to tank 20 at all.

The operation of the aquarium is substantially as follows. Presuming that all of tanks 20 and filter cases 28 are in position as shown, and that each tank-filter combination includes sufficient water to fill both the tank and the filter case to the levels indicated, both of valves 56 and 64 of each combination will be open. Air delivered by pump 48 will then be fed by the pipe 54 of each tank-filter combination through valve 56 (then open) to aspirator pump 60 where it functions as previously described to draw water from the bottom portion of the associated tank upwardly through pipe 96, and hence through valve 64 (then open) and pipe 66, discharging the air and water from spout 70 into water chamber 38 of filter case 28. The water within pump 60 and pipe 66 is broken up into a fine spray or droplets, and is hence thoroughly aerated. The water deposited in chamber 38, seeking a common level in filter chamber 40, passes upwardly throuh the perforated floor 36 of the latter chamber and through the filter material 42 therein, whereby it is thoroughly cleaned of all filterable contaminative material. The water then overflows into pipe 44, and discharged from spout 46 into the top of tank 20. The circulation, aeration and filtration provided as just described is continuous, thorough and efficient. While all of the tank-filter combinations are driven by a single source of air, there is no possibility of a cross connection between said combinations which could cause intermixture of the water of the different combinations. This intermixture obviously should be avoided where, for example, the water of one tank may contain medication to which the fish in other tanks are not to be subjected, or when the fish of any tank have been isolated therein by reason of some communicable disease.

The aquarium or any element thereof, may be easily and conveniently serviced without interrupting the operation of other elements. For example, when any of filter cases 28 need be removed, as of course is required for periodic cleaning and recharging, it may be removed by lifting lid 12, sliding the filter case forwardly to a point where it does not underlie spout 70, and lifting it free from the housing. When any of tanks 20 need be removed, as must be done from time to time to change the water or to treat its occupants, it may be removed simply by turning it about its axis to align tabs 24 with notches 26, and lowering it free of pipe 96. Neither the filter cases nor the tanks have any direct, sealed connection to the air system, and hence no connections need be made or broken when the filter cases or tanks are inserted or removed. This eliminates an often tedious and somewhat delicate operation.

If any filter case 28 is removed as just descrbed, the operating arm 86 of its associated valve 64 tilts to close its associated valve 64, so that no water is discharged from spout 70 when there is no filter case in position to receive it. At the same time, the closure of valve 64 causes air to be deflected into side passage 94 of the aspirator pump, and this air bubbles from the lower end of pipe 96 to maintain aeration while the filter case is not in place. This bubbling serves as a positive visual indication that that tank is not equipped with a filter, since no bubbling occurs in normal operation, and thus tends to prevent accidental omission or failure to insert a filter case. When a filter case is inserted, it must also be slid rearwardly on its supports 30 to position it under spout 70, until arm 86 is engaged and pivoted thereby to open valve 64, before the bubbling ceases.

If any tank 20 is removed as described above, the associated float ball 78 of course falls by gravity, prvoting arm 76 to close the associated valve 56. Closure of valve 56 of course cuts off all air supply to the associated aspirator pump, and thus prevents the drainage on the air supply which might otherwise occur by reason of operation of the aspirator pump under a no-load condition. Such drainage of the available air might cause faulty or inefficient functioning of the water circulation systems of other tank-filter combinations still in use. Valve 64, on the other hand, remains open at this time. This creates an open, unrestricted passage from spout 70 to the lower end of pipe 96, through side passage 94 of the aspirator pump, so that any water remaining in said passage when the tank is removed can drain freely into the tank as the latter is held momentarily beneath the lower end of pipe 96.

While I have shown and described a specific embodiment of my invention, it will be readily apparent that many minor changes of structure and operation could be made without departing from the spirit of the invention.

What I claim as new and desire to protect by Letters Patent is:

1. An aquarium comprising:
   a. a housing, b. a series of transparent tanks carried by said housing, depending from said housing and opening upwardly thereinto, c. a series of open-topped filter cases supported in said housing, each above one of said tanks, and having an outlet opening disposed directly above its associated tank, d. filter material in said filter cases, and e. circulating means operable to draw water from all of said tanks and to deposit said water from each tank into the top of its associated filter case, said circulating means comprising means operable to deliver air under pressure, a series of spouts directed respectively into the tops of said filter cases, a series of conduits connecting said air delivery means respectively to said spouts, an air-operated pump interposed in each of said conduits and operable to create a suction, and a conduit interconnected to the suction side of each of said pumps and depending into the associated tank.

2. An aquarium as recited in claim 1 wherein said spouts, pumps and conduits are all mounted on and supported by said housing, said filter cases and tanks being individually detachable from said housing, and having no sealed connection with any element of said circulating means.

3. An aquarium as recited in claim 1 wherein said tanks are individually detachable from said housing, and with the addition of:

a. a valve interconnected in each of said conduits intermediate the pump thereof and said air delivery means, and b. valve operating means responsive to the presence of the associated tank in said housing to close said valve when said tank is detached from said housing, and to open said valve when said tank is attached to said housing.

4. An aquarium as recited in claim 3 wherein each of said valves is float-operated by means including a buoyant float adapted to be supported by the water in the associated tank.

5. An aquarium as recited in claim 1 wherein said filter cases are individually detachable from said housing, and with the addition of:

a. a valve interconnected in each of said conduits intermediate the pump thereof, and the associated spout, and b. valve operating means responsive to the presence of the associated filter case in said housing to close said valve when said filter case is removed from said housing, and to open said valve when said filter case is inserted in said housing.

6. An aquarium as recited in claim 5 wherein said valve operating means includes a mechanical valve operator comprising an arm having a normal position in which said valve is closed, but engageable and movable by said filter case as it is inserted in said housing to open said valve.

7. An aquarium as recited in claim 1 wherein said tanks and said filter cases are individually removable from said housing, and with the addition of:

a. a first normally closed valve interposed in each of said conduits intermediate the pump thereof and said air delivery means, b. means mechanically responsive to the presence of the associated tank in said housing to close said first valve when said tank is inserted in said housing, c. a second nomally closed valve interposed in each of said conduits intermediate the pump thereof and the associated spout, and d. means mechanically responsive to the presence of the associated filter case in said housing to open said second valve when said filter case is inserted in said housing.

* * * * *